Jan. 4, 1966   E. M. GREER   3,227,435
RESILIENT DEVICE
Filed April 11, 1963   2 Sheets-Sheet 1

INVENTOR.
EDWARD M. GREER
BY
Dean, Fairbank & Hirsch
ATTORNEYS

Jan. 4, 1966  E. M. GREER  3,227,435
RESILIENT DEVICE
Filed April 11, 1963  2 Sheets-Sheet 2

INVENTOR.
EDWARD M. GREER
BY
Dean, Fairbank & Hirsch
ATTORNEYS

United States Patent Office 3,227,435
Patented Jan. 4, 1966

3,227,435
RESILIENT DEVICE
Edward M. Greer, Beverly Hills, Calif., assignor to Greer Hydraulics, Inc., Los Angeles, Calif., a corporation of New York
Filed Apr. 11, 1963, Ser. No. 272,389
3 Claims. (Cl. 267—1)

This invention relates to the art of resilient devices and more particularly to a hydropneumatic spring.

As conducive to an understanding of the invention it is noted that where a heavy load must be resiliently supported to take up shock or impact and a mechanical spring is used for this purpose, due to the large size of the spring required to withstand such heavy load, it is relatively costly.

Furthermore, where such mechanical spring is compressed or stretched by such heavy load and remains under such loading for a long period of time, it tends to take a permanent set and hence may become inoperative.

In addition, where it is desired to vary the characteristics of a mechanical spring such as the rate of spring action or the load carrying capabilities thereof, this requires that the length of the spring be varied which is difficult to do especially where the spring is a heavy one with wire of relatively large cross section and furthermore the spring may not be readily accessible and the adjustment would require disassembly of the installation in which the spring is incorporated to provide access thereto.

In addition, where a plurality of mechanical springs are utilized for a single support that is subject to a heavy load such as a platform that must be kept level, since the force exerted by each spring may differ, it is a difficult and time consuming task to balance each spring so that they all exert the same force and this problem becomes more severe as the size of the springs are increased.

It is accordingly among the objects of the invention to provide a resilient device that is relatively simple in construcution and may readily be fabricated at relatively low cost, which will support loads of any amount within the structural limitation of the unit itself and which with relatively simple adjustments may readily be adjusted both to vary the load absorption properties and the rate of spring action.

According to the invention these objects are accomplished by the arrangement and combination of elements hereinafter described and more particularly recited in the claims.

Figure 1:
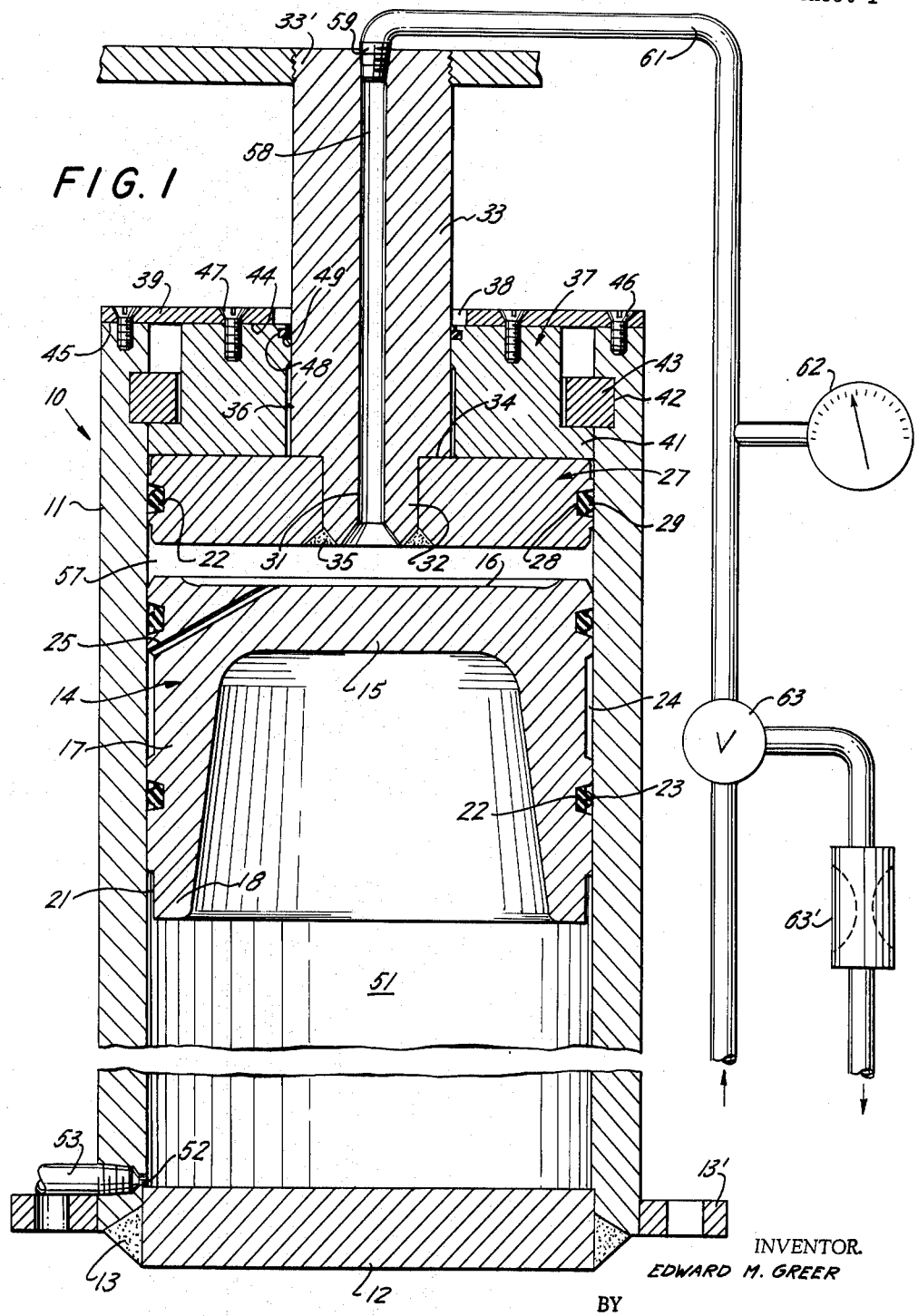
Figure 2:
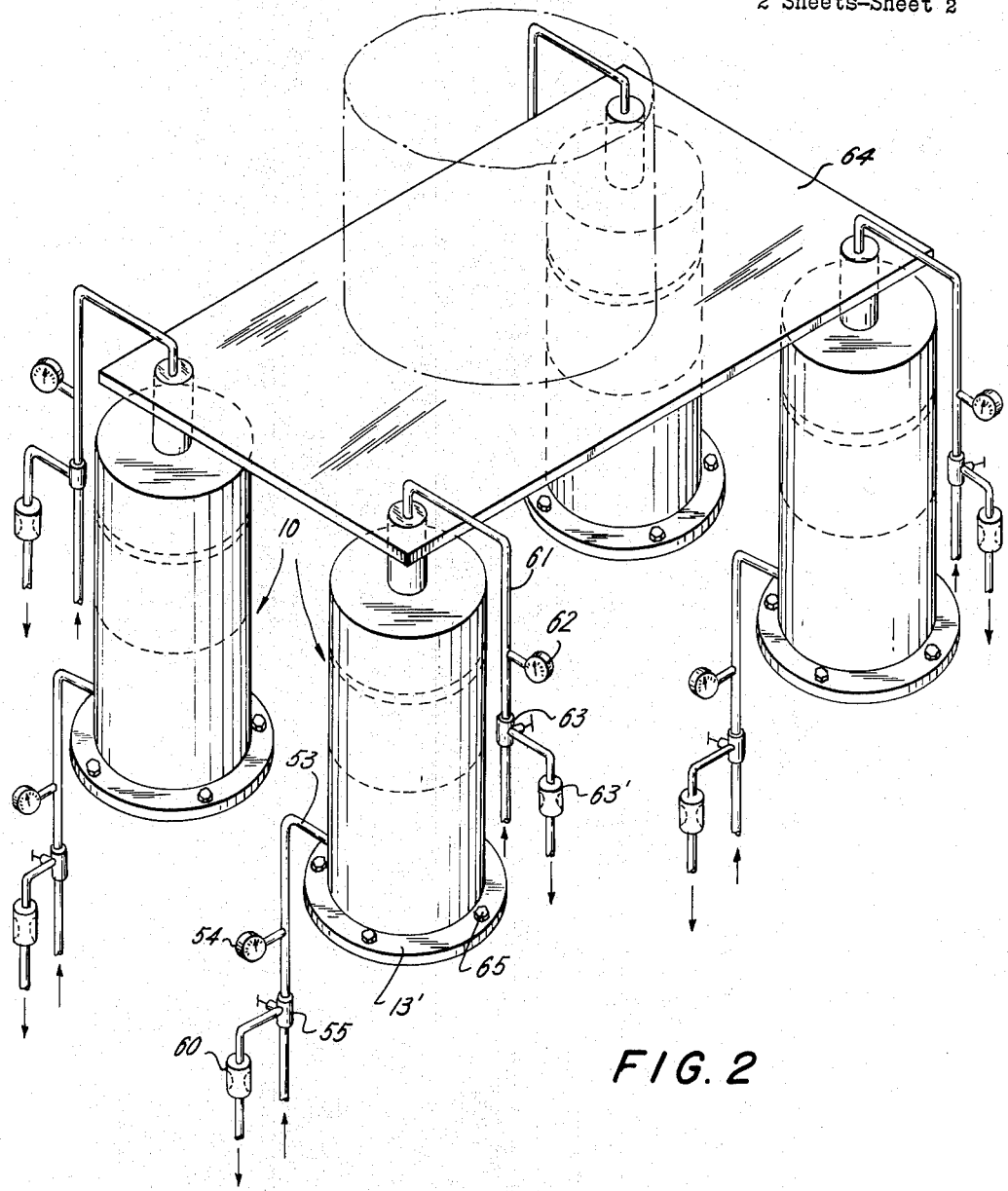

In the accompanying drawings in which is shown one of various possible embodiments of the several features of the invention, FIG. 1 is a longitudinal sectional view of a hydro-pneumatic spring according to the invention, and FIG. 2 is a diagrammatic view of the invention incorporated in a platform mount.

Referring now to the drawings, as shown in FIG. 1 the resilient device comprises a cylindrical casing 11 of strong rigid material capable of withstanding high pressure, having one end thereof closed by a cover plate 12 secured in place as by welding at 13, said closed end having illustratively a mounting flange 13'.

Slidably mounted in the casing is a cup-shaped piston 14, the end wall 15 of which desirably has a relatively shallow circular recess 16 in the face thereof remote from the cover plate 12.

The side wall 17 of piston 14 adjacent the free end 18 thereof is of reduced outer diameter as at 21 to provide clearance between the inner surface of the casing wall and the piston wall 17 for the purpose hereinafter set forth.

The outer surface of side wall 17 of the piston 14 adjacent end wall 15 has a pair of spaced annular grooves 22 in each of which a resilient sealing member such as an O 23 is positioned. In addition, an elongated annular groove 24 is provided in said side wall 17 between grooves 22, and a passageway 25 leads from annular groove 24 into circular recess 16 in end wall 15.

Also slidably mounted in the casing 11 is an additional piston 27 which has an annular groove 28 in its periphery in which a resilient sealing member such as an O ring 29 is positioned.

The piston 27 has an axial bore 31 in which is positioned the reduced diameter end 32 of a piston rod 33, said reduced diameter end 32 defining an annular shoulder 34 which seats against the periphery of bore 31.

Although the piston rod 33 may be secured in bore 31 in any suitable manner, it illustratively is held in place as by welding at 35.

The piston rod 33 extends through the axial bore 36 of a stop ring 37 and through the axial opening 38 of a cover plate 39.

As is clearly shown in FIG. 1, the stop ring 37 has an annular outwardly extending flange 41 at its inner end. The inner surface of the casing has an annular groove 42 adapted releasably to receive a retaining member such as a resilient split ring 43 which, when positioned in the groove 42 will act as an abutment for flange 41 to prevent outward movement of stop ring 37.

The stop ring 37 is of such thickness that when the flange 41 thereof abuts against split ring 43 the outer surface 44 of the stop ring will be flush with the end 45 of the casing 11.

The periphery of the cover plate 39 is secured as by screws 46 to the end 45 of the casing 11 and the stop ring 37 and the cover plate 39 are retained together as by screws 47.

The outer end of the bore 36 of the stop ring 37 has an annular groove 48 in which an annular wiper 49 is positioned.

With the arrangement above described, a gas chamber 51 is provided between piston 14 and cover plate 12 which may be charged with gas under pressure through a port 52, illustratively extending laterally into chamber 51 adjacent the cover plate 12, said port being exposed in the annular groove defined by the reduced portion 21 of the piston wall 17 when the free end 18 of the piston 14 abuts against cover plate 12.

The port 52 (FIG. 2) is illustratively shown connected by a line 53 to a pressure gauge 54 and through a manually operated three-way selector valve 55 to a source of gas under pressure. The valve thus has a closed position, a second position in which line 53 will be connected to such source of pressure and a third position whereby line 53 will be connected through flow restrictor 60 to atmosphere.

The arrangement above described also provides an oil chamber 57 (FIG. 1) between pistons 14 and 27 which may be charged with oil through an axial bore 58, extending through piston rod 33. The outer end of the bore 58 illustratively is internally threaded as at 59 to receive the correspondingly threaded end of an oil line 61 which is connected to pressure gauge 62 and through a manually operated three-way selector valve 63 to a source of oil under pressure. The valve 63 thus has a closed position, a second position in which line 61 will be connected to such source of pressure and a third position whereby line 61 will be connected through flow restrictor 63' to a reservoir.

Although the device above described and shown in FIG. 1 has many applications, in FIG. 2 it illustratively is shown to support a platform 64 on which a load is carried. Thus, as illustratively shown in FIG. 2, four of the resilient devices 10 are provided to take up shock, each mounted at one corner of the platform.

The devices 10 are secured in upright position on a firm base by means of bolts 65 extending through the mounting flange 13'. The end 33' of each piston rod 33 is screwed into a correspondingly threaded opening in each corner of platform 64 and the pressure lines 53 and 61 are connected respectively to the ports 52 and 59 of each device 10.

To set up the equipment for operation the chamber 51 is charged through valve controlled port 52 with gas under pressure which will force the piston 14 upwardly until it abuts against piston 27. Thus, a predetermined quantity of compressed gas will be contained in chamber 51 depending upon the volume of said chamber and the gas pressure may be read from the gauge 54 associated with each device 10.

The chamber 57 between the pistons 14 and 27 is charged with oil under pressure through valve controlled port 59 and through the axial bore 58 in piston rod 33 thereby moving the piston 14 away from piston 27.

Since the oil in chamber 57 is substantially incompressible, depending upon the quantity of oil forced into such chamber 57, the volume of the gas in chamber 51 will be reduced and its precharge pressure increased to a predetermined value which can be determined on the associated pressure gauge 54.

Since the physical dimensions of all of the resilient devices 10 used in FIG. 2 are identical, it is apparent that when the pressure gauges 54 associated with the devices 10 all indicate the same amount, the devices will be in balance and the platform 64 will be in a horizontal plane.

In operation of the installation, so long as the force exerted against the platform 64 remains constant, no movement will be imparted to the piston rods 33. If any momentary increase of force is exerted against the platform 64, the piston rods 33 and pistons 27 and 14 (due to the intervening non-compressible oil in chamber 57) will move downwardly, further compressing the gas in chamber 51 to take up such momentary increase in the load. Thereupon, the pistons and piston rods will move upwardly when the load is decreased to its original amount.

The unit thus effectively acts as a spring which may readily be adjusted. Thus, one adjustment can be made of the rate of spring effect by merely changing the volume of the gas chambers 51 by forcing more oil into the chambers 57 through bores 58 of piston rod 33. By doing this, a harder spring is created, i.e., less volume of gas in chamber 51 and increase in pressure therein. By merely increasing the original gas pre-charge in chamber 51 the load carrying capabilities of the resilient device can be charged.

By reason of the oil contained in chamber 57 which is connected by passageway 25 to the annular groove 24 between the seals 23, such seals will be lubricated which will prevent drying of such seals with resultant deterioration thereof and loss of gas charge.

The device above described thus functions as a variable spring in that the rate of spring action can be adjusted by varying the position of the piston in its installation or balanced condition by merely forcing oil under pressure into chamber 57, the greater the amount of oil, the smaller the volume of gas in chamber 51 and hence the stiffer the spring action.

Consequently, by varying the gas charge or oil volume, a wide variety of load absorption and rate of absorption conditions can be established in a given physical configuration and these variables can be established after the unit is installed in position from external oil pumps and gas compressors.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A resilient mount comprising a platform, a plurality of hydropneumatic devices supporting said platform in substantially a horizontal plane, each of said devices comprising a casing having closed ends, means supporting said casings in vertical position, a pair of pistons slidably mounted in each of said casings, one of said pistons defining a gas chamber with respect to one of the closed ends of the casing, the space between said two pistons defining a liquid chamber, the other piston defining an additional chamber with respect to the other closed end of the casing when the other piston moves away therefrom, a piston rod connected to the other of said pistons and extending beyond the other closed end of the casing, said pistons being in sealing engagement with the wall of said casing to prevent leakage of liquid from said liquid chamber into the gas chamber and the additional chamber, said liquid chamber and said gas chamber each having an inlet port, a pressure line connected to each inlet port, a pressure gauge associated with each line, and a valve associated with each line, each of said valves having a pressure inlet port and a discharge port.

2. A hydropneumatic device comprising a casing having closed ends, a pair of pistons slidably mounted in said casing, one of said pistons defining a gas chamber with respect to one of the closed ends of the casing, the space between said two pistons defining a liquid chamber, the other piston defining an additional chamber with respect to the other closed end of the casing when the other piston moves away therefrom, a piston rod connected to the other of said pistons and extending beyond the other closed end of the casing, said pistons being in sealing engagement with the wall of said casing to prevent leakage of liquid from said liquid chamber into the gas chamber and the additional chamber, means to charge said gas chamber and said liquid chamber, said liquid chamber and said gas chamber each having an inlet port, a pressure line connected to each inlet port, a valve associated with each line, said valve having a pressure inlet port and a discharge port and a flow restrictor connected to said discharge port.

3. A resilient mount comprising a platform, a plurality of hydropneumatic devices reacting against said platform at substantially right angles thereto, each of said devices comprising a casing having closed ends, means supporting one end of said casings, a pair of pistons slidably mounted in each of said casings, one of said pistons defining a gas chamber with respect to one of the closed ends of the casing, the space between said two pistons defining a liquid chamber, the other piston defining an additional chamber with respect to the other closed end of the casing when the other piston moves away therefrom, a piston rod connected to the other of said pistons and extending beyond the other closed end of the casing, said pistons being in sealing engagement with the wall of said casing to prevent leakage of liquid from said liquid chamber into the gas chamber and the additional chamber, said liquid chamber and said gas chamber each having an inlet port, a pressure line connected to each inlet port, a pressure gauge associated with each line, and a valve associated with each line, each of said valves having a pressure inlet port and a discharge port.

References Cited by the Examiner
UNITED STATES PATENTS

| | | | |
|---|---|---|---|
| 2,367,977 | 1/1945 | Thornhill | 267—64 |
| 2,621,924 | 12/1952 | Panhard | 267—64 |
| 2,769,632 | 11/1956 | Bourcier de Carbon | 267—64 |
| 2,907,172 | 10/1959 | Crake | 267—1 |
| 3,007,694 | 11/1961 | Bingaman | 267—64 |
| 3,070,363 | 12/1962 | Ellis | 267—1 |

ARTHUR L. LA POINT, *Primary Examiner.*